Figure 1:
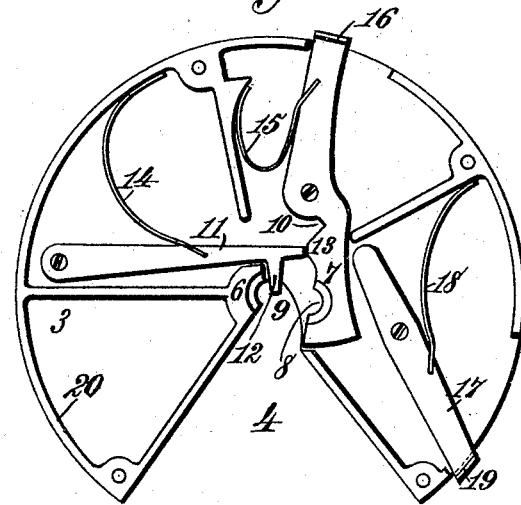

(No Model.)

E. W. PERRY, Jr.
TRIPOD OR CAMERA SUPPORT.

No. 534,912. Patented Feb. 26, 1895.

Witnesses.
Robert Everett.
A. H. Norris.

Inventor.
Enoch Wood Perry Jr.
By
James L. Norris
Atty.

UNITED STATES PATENT OFFICE.

ENOCH WOOD PERRY, JR., OF NEW YORK, N. Y.

TRIPOD OR CAMERA-SUPPORT.

SPECIFICATION forming part of Letters Patent No. 534,912, dated February 26, 1895.

Application filed May 3, 1894. Serial No. 509,976. (No model.)

*To all whom it may concern:*

Be it known that I, ENOCH WOOD PERRY, Jr., a citizen of the United States, residing at New York city, in the county of New York and State of New York, have invented new and useful Improvements in Tripods or Camera-Supports, of which the following is a specification.

This invention relates more particularly to that class of devices for immediately and unfailingly locking a photographic camera or other object to its usual supporting stand or tripod wherein there is provided on one of said parts a guide-way extended from an outer edge of the preferred part inward to a central or approximately central point and adapted to quickly guide a pin, screw, button or other projection mounted on the other part into engagement with a clip or fastening device on the part provided with said guide-way, thereby detachably securing the camera box, or like object, to the tripod or stand. A guide-way of this character is covered in Letters Patent No. 517,360, granted to me March 27, 1894, and is, therefore, not broadly claimed herein.

It is one of the purposes of my present invention to provide on one of the parts to be detachably connected, say, on the tripod or stand, an automatic locking mechanism, clip or grip, comprising a stationary jaw forming a part of one side of the socket that is to finally receive the projecting pin, button or screw on the camera bottom, or other object; a movable spring-pressed locking jaw adapted to form another part of said socket; a spring-pressed trigger to normally hold open the said movable jaw and having a tongue adapted to project into the socket in position to be pressed against by the entering button, whereby the trigger will be forced back sufficiently to release the movable spring-pressed locking jaw and permit its engagement with the button; and with or without a cam by which the button and the locking jaws may be held in rigid engagement until it is desired to release the parts.

Another purpose of my invention is to provide an improved form of longitudinally movable pin, bolt or button mounted, say, on the camera-box and so arranged that it may be easily adjusted to any required degree of protrusion and be quickly latched in a retracted position, substantially flush with the camera bottom, when the camera is to be used on some other support than a tripod provided with a socket or fastening to receive and engage said bolt or button.

My invention consists in the features of construction and novel combinations of parts in an automatic locking mechanism for quickly effecting a secure detachable connection between a camera-box, or other object, and a supporting tripod or stand, as hereinafter specified.

Figure 2:
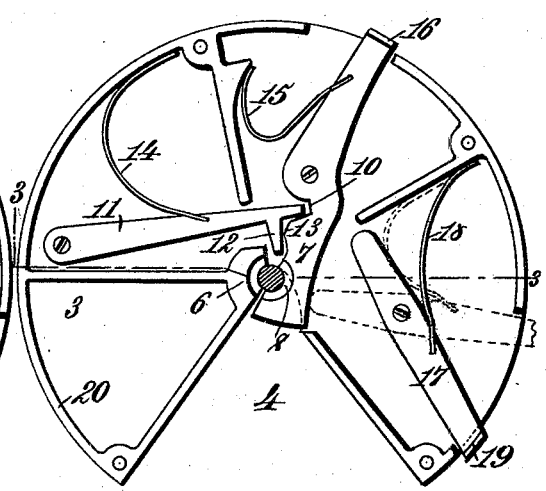
Figure 3:
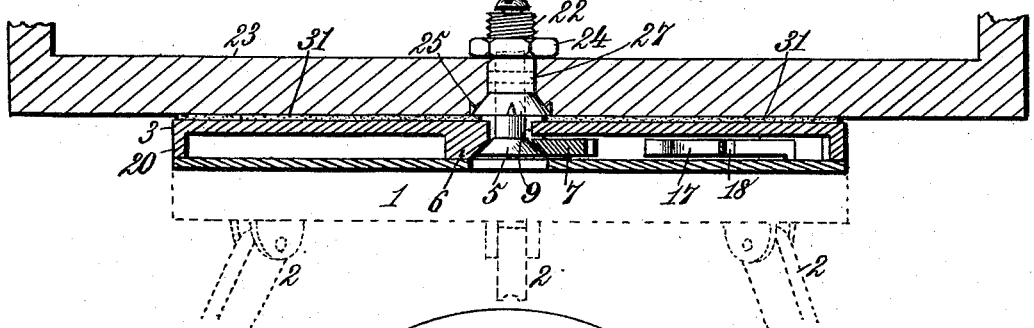
Figure 4:
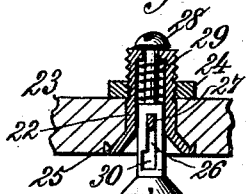
Figure 6:
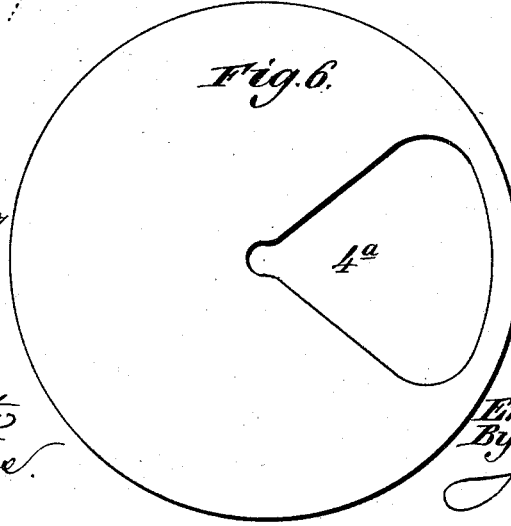
Figure 5:
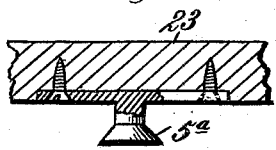

In the annexed drawings illustrating the invention—Figure 1 is an inverted plan of my improved automatic locking mechanism that may be mounted on a tripod top, and shows the tongue of the trigger projecting in position to be pressed against by the pin, button or bolt on the camera bottom so as to release a movable locking jaw that will cause the said pin, button or bolt to be securely gripped. Fig. 2 is a similar view showing the movable jaw released by the trigger and in position to coact with the fixed jaw in gripping or clasping the pin, bolt or button. Fig. 3 is an enlarged vertical section through the camera bottom and tripod top on the line 3—3 of Fig. 2, showing the pin, button or bolt on one part engaged by the jaws of the locking mechanism on the other part and exhibiting portions of the tripod legs. Fig. 4 is a sectional detail view illustrating the longitudinally movable and adjustable bolt or button mounted on the under side of a camera bottom or like object. Fig. 5 shows a portion of a camera bottom with a fixed screw or button attached to and projecting below the same. Fig. 6 illustrates a modification in the form of the guide-way for the pin, bolt, screw or button.

Referring to the drawings, the numeral 1 designates the top and 2 the legs of a tripod.

In carrying out my present invention I prefer to provide, for attachment to the tripod top or to the camera bottom, a metallic plate 3 on which the automatic clip or locking mechanism is mounted. When designed for attachment to a tripod the plate 3 may have the usual circular form of the tripod top and is substantially of the same diameter. If it is to be applied to the bottom of a camera box or other object the form and area of this plate may be made to correspond with varying requirements. Although I have shown the plate 3 mounted on a tripod I would have it understood that it may be placed on either of two parts that are to be detachably secured together.

The plate 3 is preferably provided with a guide-way 4, Figs. 1 and 2, having inclined or converging sides extended from an outer edge of said plate, which may be coincident with an outer edge of the part to which the plate is attached, inward to a central or approximately central point where the pin, bolt or button 5 or 5ª on the other part is to be received and secured. By arranging the plate 3 in such manner that the guide-way 4 will extend inward from the edge of the tripod top or edge of the camera bottom, as the case may be, and providing the said guide-way with inwardly converging sides, a more extended surface will be afforded for entrance of the pin, button or bolt 5 or 5ª so that it may be unerringly guided or directed into position without difficulty or unnecessary loss of time.

When it is desired to employ a camera separate from its usual supporting stand or tripod the camera bottom may be provided with a longitudinally movable pin 5, Figs. 3 and 4, capable of being pushed inward and latched in a retracted position so as to afford a level supporting surface on the under side of the camera box bottom. As some camera bottoms will not however, permit the convenient attachment of a vertically or longitudinally movable button or bolt I have shown in Fig. 5 a form of fixed button, bolt or screw head 5ª that may be used equally as well with the locking mechanism embraced in this invention.

Although I prefer to employ, in connection with the bolt or button 5 or 5ª and suitable locking mechanism a guide-way extended inward from an outer edge of the part on which the locking mechanism is mounted I would have it understood that the said guide-way need not in all cases be precisely coincident with the edge of the part in or upon which it is located.

In Fig. 6 is shown a guide-way 4ª extended from near the edge of the plate 3 inward toward the center and of such form and area that it will afford a very accurate means for quickly directing the pin, bolt or button to the locking mechanism.

To, preferably, the under side of the plate 3, at the inner end of the guide-way 4 or 4ª and adjacent to one of its sides, is secured the fixed jaw 6 of the locking mechanism. A movable locking jaw 7 is pivoted to the plate 3 in such position as to be capable of coacting with the jaw 6 to clip or grip the bolt or button 5 or 5ª when the parts are brought together. Each jaw is formed with a segmental recess 8 adapted to form part of a socket 9 extended through the plate 3 at the inner end of the guide-way 4, to receive the bolt, pin or button. The movable jaw 7 is provided with a recess or notch 10 to receive the free inner end of a trigger 11 when the locking jaws are in a closed position. This trigger 11 is pivoted at its outer end to the plate 3 and is provided near its inner end with a laterally extended tongue 12 adapted to project into the socket 9, as shown in Fig. 1, while the free end of the trigger bears against a lug or projection 13 on the movable jaw 7 and thus normally holds it open, or away from the fixed jaw.

The trigger 11 is provided with a suitable spring 14 under the action of which the trigger is normally held in such position that its free end will bear against the lug 13 of the movable jaw 7, holding the same open and thus permitting the trigger tongue 12 to project in position to receive the pressure of the entering pin, bolt or button when it reaches the inner end of the guide-way. The pressure of the pin, bolt or button 5 or 5ª against the tongue 12 forces the trigger 11 backward until its free end passes off from the lug 13 and becomes engaged in the recess 10 of the movable jaw. This permits the movable jaw 7 to close as shown in Fig. 2, under the action of a spring 15 with which it is provided, and in this manner the pin, bolt or button 5 or 5ª is securely grasped between the segmental recesses 8 of the two jaws.

On the outer end of the movable jaw 7 is a handle 16 through which it may be manipulated for the purpose of moving said jaw outward to release the engaged pin, bolt or button. As soon as the movable jaw 7 is moved outward, thereby releasing the free end of the trigger 11 from the notch or recess 10, the spring 14 will throw the trigger into position to bear against the lug 13 and hold the jaw 7 open and the trigger tongue 12 will at the same time be carried into position to be again pressed by an entering pin, button or bolt and repeat the automatic action of the locking mechanism.

In order to hold the movable jaw 7 perfectly rigid when closed into locking engagement with a pin, bolt, stud or button, a cam lever 17 may be pivotally mounted on the plate 3 in such position that it may be forced into frictional engagement with the outer side of the closed jaw. The cam 17 is provided with a spring 18 arranged to normally hold the cam out of the path of the movable jaw. On the outer end of the cam lever 17 is a handle 19 through which it may be manipulated. The movable jaw 7 having been closed by the action of an entering pin, bolt or button pressing back the trigger 11, the spring pressed cam 17 may be turned by means of its handle 19 into such position that it will bear against the closed movable jaw and thus cause the pin, button or bolt to be held in rigid clamping engagement by the two locking jaws, without any possible liability of accidental disengagement. By first turning backward the cam lever 17 and then the movable locking jaw 7 the tripod and camera, or other object, can be readily disconnected.

On the plate 3, at or near its edges and in other suitable positions are arranged ribs or ledges 20 to support a covering plate 21 by which the locking mechanism may be inclosed. Some of these ledges 20 may also serve as bearings for the springs of the movable locking jaw, the trigger and the cam lever. The ribs or ledges 20 should be of sufficient depth or thickness to afford ample space between the plates 3 and 21 for a proper working of the locking mechanism. At required points on the periphery of the plate 3 are suitable openings between the ribs or ledges 20 to permit passage of the outer ends of the movable locking jaw and the cam lever.

The longitudinally movable pin, bolt or button 5 is preferably mounted in a thimble 22, Figs. 3 and 4, that may be secured in and flush with the bottom 23 of a camera box, or other object. As shown the thimble 22 may be inserted into a perforation in the bottom of the camera box and be secured therein by a nut 24 turned onto a screw threaded portion of the thimble. If desired the flared or flanged portion of the thimble may be provided with spurs or sharp projections 25 adapted to penetrate the wooden bottom of the camera box and prevent the thimble from turning when the nut 24 is screwed home. In the shank of the pin, bolt or button 5 is a longitudinal slot 26 of sufficient length to permit a vertical play of the bolt or button on a transverse supporting pin 27 that is passed through said slot and secured in the sides of the thimble. An adjusting screw 28 is passed vertically through an opening in the inner end of the thimble 22 and is inserted into the end of the button shank a sufficient distance to serve as a means for adjusting the working length of the slot 26 so as to vary the extent to which the bolt or button 5 may be protruded. By means of a spring 29 surrounding the shank of the screw 28, between the thimble and the button shank, the bolt or button 5 is normally forced outward so that its head will protrude in proper position to be capable of entering the guide-way 4 or 4ª and become engaged with the jaws of the locking mechanism previously described. The lower end of the bolt or button slot 26 is provided with an offsetting recess or bayonet notch 30 that may be brought into latching engagement with the transverse supporting pin 27 when the bolt or button 5 is pushed inward and partially turned. In order to facilitate turning the button 5 to thus latch it with the transverse pin 27 the button head is preferably milled or roughened, as shown.

When the camera box is to be used with a tripod the longitudinally movable bolt or button 5 will be turned or slightly rotated so as to become unlatched from the pin 27 and under the action of its spring 29 it will be then protruded in position to engage a locking mechanism on the tripod. The degree of protrusion may be regulated by means of the adjusting screw 28, varying the length of the slot 26, as before explained. If it should be desired to use the camera separated from a tripod, a level supporting surface may be obtained on the under side of the camera box bottom by forcing the spring button or bolt 5 inward and partially rotating it into latching engagement with the transverse pin 27 on which it will then remain in a retracted position until again required for use with the locking mechanism of a tripod.

The head of the bolt or button 5 or 5ª and the edges of the segmental recesses 8 in the locking jaws may be beveled or undercut to correspond with each other and the diameter of the bolt or button head is preferably a little greater than that of the socket formed in said jaws, so that they will hold the bolt or button with a firmer grasp.

It is obvious that the automatic locking mechanism and accompanying guide-way may be located on either of the two parts to be connected, whether a tripod top or camera box bottom, the pin, bolt or button being mounted on the other one of said parts. For the purpose of causing the camera to have a frictional or binding contact with its supporting stand or tripod the plate or casing that carries or incloses the automatic locking mechanism may be provided with a covering of cloth 31, or other suitable material.

As is well known, it is frequently very difficult to make a quick and secure connection between a camera and its supporting stand or tripod, the fastening devices being concealed from view on bringing the camera box and tripod together. It will be seen, however, that with the construction and arrangement of devices herein described the sense of touch will enable the bolt, pin or button on one part to be readily and quickly engaged with the guide-way and accompanying automatic locking mechanism on the other part, thus effecting a secure detachable connection without difficulty or delay.

What I claim as my invention is—

1. The combination with a camera or other object, a supporting stand, and a pin, bolt or button on one of said parts, of an automatic locking mechanism mounted on the other one of said parts and comprising a fixed jaw, a movable spring pressed locking jaw, and a trigger to normally hold open the said movable jaw and having a tongue adapted to project in position to be pressed against by said bolt, pin or button, whereby the trigger is caused to release the movable locking jaw and permit its automatic engagement with the bolt, pin or button, substantially as described.

2. The combination with a camera or other object, a supporting stand, and a pin, bolt or button on one of said parts, of an automatic locking mechanism mounted on the other one of said parts and comprising a fixed jaw, a movable locking jaw, and a spring pressed trigger to normally hold open the said movable jaw and having a tongue adapted to project in position to be pressed against by said pin, bolt or button, the said movable jaw being provided with a recess to receive the free end of the trigger as it is forced back by the entering pin, bolt or button, whereby the trigger is caused to release the movable jaw and permit engagement of the said pin, bolt or button by the jaws of the automatic locking mechanism, substantially as described.

3. The combination with a camera or other object, a supporting stand, and a pin, bolt or button on one of said parts, of an automatic locking mechanism mounted on the other one of said parts and comprising a fixed jaw, a movable jaw and a trigger to normally hold the movable jaw open and release it under the action of the entering pin, bolt or button, and a cam adapted to hold the movable jaw in rigid engagement with said pin, bolt or button, substantially as described.

4. The combination with a camera or other object, a supporting stand and a pin, bolt or button on one of said parts, of an automatic locking mechanism mounted on the other one of said parts and comprising a fixed jaw, a movable spring pressed jaw provided with a handle and a spring pressed trigger to normally hold the movable jaw open and release it under the action of the entering pin, bolt or button, and a spring pressed cam lever provided with a handle and adapted to hold the closed movable jaw in rigid engagement with the pin, bolt or button, substantially as described.

5. The combination with a camera or other object, a supporting stand and a pin, bolt or button on one of said parts, of an automatic locking mechanism mounted on the other one of said parts and comprising a fixed jaw, a movable jaw and a trigger to normally hold the movable jaw open and release it under the action of the entering pin, bolt or button, and a guide-way to direct the said pin, bolt or button quickly into engagement with the automatic locking mechanism, substantially as described.

6. The combination with a camera or other object, a supporting stand and a pin, bolt or button on one of said parts, of an automatic locking mechanism mounted on the other one of said parts and comprising a plate having a guide-way for said pin, bolt or button, automatic locking devices attached to said plate in proximity to the inner end of the guide-way, and a covering plate for said locking devices, substantially as described.

7. The combination with a camera or other object, a supporting stand, and a locking mechanism mounted on the stand, of a longitudinally movable pin, bolt or button mounted vertically in the under side of the camera or like object and having a milled or roughened head on its lower end and a bayonet slot in its shank, a transverse supporting pin passed through said slot, whereby on pushing inward and slightly rotating the said pin, bolt or button its bayonet slot will be latched onto said transverse pin to retain the said button in a retracted position, a spring to protrude the button or bolt when unlatched and thereby permit its engagement with the locking mechanism on the stand, and an adjusting screw to vary the working length of the slot in the bolt or button shank, substantially as described.

8. The combination with a camera or other object, and a supporting stand having a locking mechanism mounted thereon, of an externally screw threaded thimble inserted in the under side of the camera or like object, a nut for securing said thimble in place, a longitudinally movable pin, bolt or button mounted in the thimble and adapted to protrude below the same or be pressed inward and flush with the camera bottom, the shank of said bolt or button being provided with a bayonet slot, and a transverse supporting pin passed through said slot and onto which the slot of the bolt or button is adapted to be latched, substantially as described.

9. The combination with a camera or other object, and a supporting stand having a locking mechanism mounted thereon and provided with an entering guide-way, of a thimble secured in the under side of the camera or like object, a longitudinally movable pin, bolt or button mounted in the thimble and provided with a bayonet slot, a transverse supporting pin passed through said slot and in which the bolt or button is adapted to be latched when pressed inward and slightly rotated, a spring to protrude the bolt or button when unlatched, and an adjusting screw for regulating the degree of protrusion by varying the working length of the slot in the bolt or button shank, substantially as described.

In testimony whereof I have hereunto set my hand and affixed my seal in presence of two subscribing witnesses.

ENOCH WOOD PERRY, Jr. [L. S.]

Witnesses:
GEORGE F. ESCHBACH,
F. L. ESCHBACH.